United States Patent [19]
Couillard et al.

[11] Patent Number: 5,985,088
[45] Date of Patent: *Nov. 16, 1999

[54] METHOD AND APPARATUS FOR AN IMPROVED ROLLER SYSTEM FOR CALENDER MACHINES

[75] Inventors: Cal L. Couillard, Deerfield; Bruce Adams, Madison, both of Wis.

[73] Assignee: Hunt Holdings, Inc., Wilmington, Del.

[*] Notice: This patent is subject to a terminal disclaimer.

[21] Appl. No.: 09/033,014

[22] Filed: Mar. 2, 1998

Related U.S. Application Data

[60] Continuation of application No. 08/847,559, Apr. 24, 1997, Pat. No. 5,810,967, which is a division of application No. 08/372,511, Jan. 13, 1995, Pat. No. 5,643,391.

[51] Int. Cl.⁶ ................................................. B30B 3/04
[52] U.S. Cl. ........................ 156/324; 156/555; 100/176
[58] Field of Search ................................. 156/324, 555, 156/580, 582, 583.1; 100/327, 155 R, 160, 176

[56] References Cited

U.S. PATENT DOCUMENTS

| | | | |
|---|---|---|---|
| 2,137,505 | 11/1938 | Osgood | 144/282 |
| 2,722,735 | 11/1955 | Beamish | 29/471.7 |
| 3,027,285 | 3/1962 | Eisner et al. | 156/359 |
| 3,132,581 | 5/1964 | Isbey et al. | 100/171 |
| 3,453,169 | 7/1969 | Buck et al. | 156/555 |
| 3,481,376 | 12/1969 | Keller | 144/281 |
| 3,577,304 | 5/1971 | Guyer | 156/555 |
| 3,660,207 | 5/1972 | Schrade et al. | 156/555 |
| 3,711,355 | 1/1973 | Staats et al. | 156/499 |
| 3,797,341 | 3/1974 | Bystron | 269/21 |
| 3,840,420 | 10/1974 | Sarcia | 156/358 |
| 3,901,758 | 8/1975 | Humphries | 156/499 |
| 3,943,031 | 3/1976 | Krueger et al. | 156/583 |
| 4,089,729 | 5/1978 | Leloux | 156/498 |
| 4,135,962 | 1/1979 | Sinclair et al. | 156/387 |
| 4,462,854 | 7/1984 | Wenstrom et al. | 156/250 |
| 4,470,589 | 9/1984 | Singer | 271/11 |
| 4,498,941 | 2/1985 | Goldsworthy | 156/148 |
| 4,517,042 | 5/1985 | Singer | 156/164 |
| 4,589,942 | 5/1986 | Korinek | 156/148 |
| 4,619,728 | 10/1986 | Brink | 156/555 |
| 4,743,334 | 5/1988 | Singer | 156/499 |
| 4,842,215 | 6/1989 | Takami | 242/156 |
| 4,861,409 | 8/1989 | Hashida | 156/308.2 |
| 4,990,215 | 2/1991 | Anderson | 156/540 |
| 5,158,641 | 10/1992 | Vermeulen et al. | 156/555 |
| 5,232,538 | 8/1993 | Liu | 156/359 |
| 5,275,684 | 1/1994 | Marazzi et al. | 156/359 |
| 5,368,677 | 11/1994 | Ueda et al. | 156/362 |
| 5,643,391 | 7/1997 | Couillard et al. | 156/324 |
| 5,810,967 | 9/1998 | Couillard et al. | 156/555 |

FOREIGN PATENT DOCUMENTS

| | | |
|---|---|---|
| 0 237 460 | 9/1987 | European Pat. Off. . |
| 0 320 965 | 6/1989 | European Pat. Off. . |
| 2 158 771 | 11/1985 | United Kingdom . |

OTHER PUBLICATIONS

Advertising flyer entitled "Tiger—The Laminator Designed for Vinyl Applications".
Training Sheet entitled "Pro-Tech Laminators".
Schematic Layout entitled "Premask Graphics (Sheet Form)".
Broadline Catalog, "Vinyl Tigers –VT–60, VT–80", p. 7 and price quotation page.
"Magnum 63i" Standard Equipment page.
Sketch of modified OMMA unit.

*Primary Examiner*—James Sells
*Attorney, Agent, or Firm*—Synnestvedt & Lechner LLP

[57] ABSTRACT

An improved pull-roller system for a calender machine having at least a pair of main rollers and a pair of pull-rollers. The nip of the pull-rollers is located at an elevation below the nip of the main rollers. In addition, the axis of the top pull-roller is offset with respect to the axis of the bottom pull-roller.

17 Claims, 4 Drawing Sheets

METHOD AND APPARATUS FOR AN IMPROVED ROLLER SYSTEM FOR CALENDER MACHINES

CROSS-REFERENCE TO RELATED APPLICATIONS

This is a continuation of U.S. application Ser. No. 08/847,559, filed Apr. 24, 1997, U.S. Pat. No. 5,810,967, which is a divisional of U.S. application Ser. No. 08/372,511, filed Jan. 13, 1995, now U.S. Pat. No. 5,643,391, issued Jul. 1, 1997.

FIELD OF THE INVENTION

This invention relates generally to calender machines and more particularly to an improved roller system for laminating machines.

BACKGROUND OF THE INVENTION

Sundry calender machines are known in the art which utilize a plurality of rollers for applying compressive pressure to a workpiece. Particularly well known calender machines are apparatus for laminating a transparent plastic film to one or both sides of a substrate, e.g., a printed document, photograph, poster, etc., for the purpose of protecting the substrate from aging ana environmental factors. Many laminating films are heat-activated. Accordingly, laminating machines also include a means of heating the film.

There are two general types of laminating machines. The first type heats the plastic film before it passes through a pair of pressure rollers. The substrate, or workpiece, and the heated plastic film are then pressed together at a nip point of the pair of pressure rollers. The second type of laminating apparatus heats one or both of the pressure rollers. The plastic film and substrate are fed into the nip of the heated rollers and heated precisely at the point of pressurization.

Both types of laminating machines usually include a second pair of rollers for moving the workpiece through the laminating process in a regular and orderly manner. This second pair of rollers, called the pull-rollers, are usually not heated. The pull-roller assembly includes a drive system for actively rotating one or both of the pull-rollers thereby pulling the substrate through the laminating machine. In this manner, the pull-rollers apply tension to the film. Moreover, compressive pressure is applied to the workpiece as it passes through the nip between the pull-rollers.

A particular problem associated with laminating machines is that heat must be applied evenly to the plastic film to ensure proper lamination. In addition, it is necessary to provide sufficient and uniform tension to the plastic film to ensure that the plastic film lies completely flat against the substrate.

When a thin substrate is laminated, e.g., paper, the finished workpiece has a tendency to curl. The curling problem tends to be more severe when the laminating film is pre-cut to the approximate size of the article to be laminated. In laminating machines that employ continuous strips or webs of laminating film, the curling problems can be reduced by winding the finished product around a collecting roll. Sometimes, a heating unit is interposed in advance of the collecting roll to re-soften the adhesive of the plastic film. However, the addition of a collecting roll and heating unit increases the cost of the equipment and is unsuitable for desk top and other small laminating machines.

Another problem with calender machines in general, is that a workpiece must be manually fed into each nip between the rollers. As can be expected in these situations, the operator, concentrating on ensuring a properly laminated substrate, occasionally has his or her fingers pinched in a nip.

SUMMARY OF THE INVENTION

The present invention is directed towards an improved roller system for use in any calender machine having a plurality of sets of rollers. Preferably, the subject invention is designed for use in a laminator.

A laminating machine which laminates a protective film to a workpiece or substrate includes a pair of heated cylindrical rollers in contact with each other to form a nip through which the substrate and film are fed. A platform is positioned on the feed side of the nip (sometimes called a feedway) for supporting the workpiece.

The platform has a substantially horizontal top surface defining a first plane. The nip of the heated rollers is planar to the top surface of the platform.

The axes of rotation of the main rollers are parallel to the first plane. A second plane, common to the axes of the heated main rollers, is vertical, i.e., substantially perpendicular to the first plane.

A pull-roller system for pulling the substrate and film through the laminating machine includes a pair of cylindrical rollers in contact with each other to form a second nip. The pull-roller nip is positioned at an elevation different than the elevation of the first plane.

Each pull-roller has an axis of rotation parallel to the first plane. In another variation, a third plane, common to the pull-roller axes, is offset from the first plane. That is, the axis of the upper pull-roller is offset from vertical with respect to the axis of the bottom pull-roller by a predetermined offset angle.

The objects and advantages of the subject invention will become apparent from a consideration of the following description and accompanying drawings.

DETAILED DESCRIPTION OF THE PREFERRED EMBODIMENTS

Figure 1:
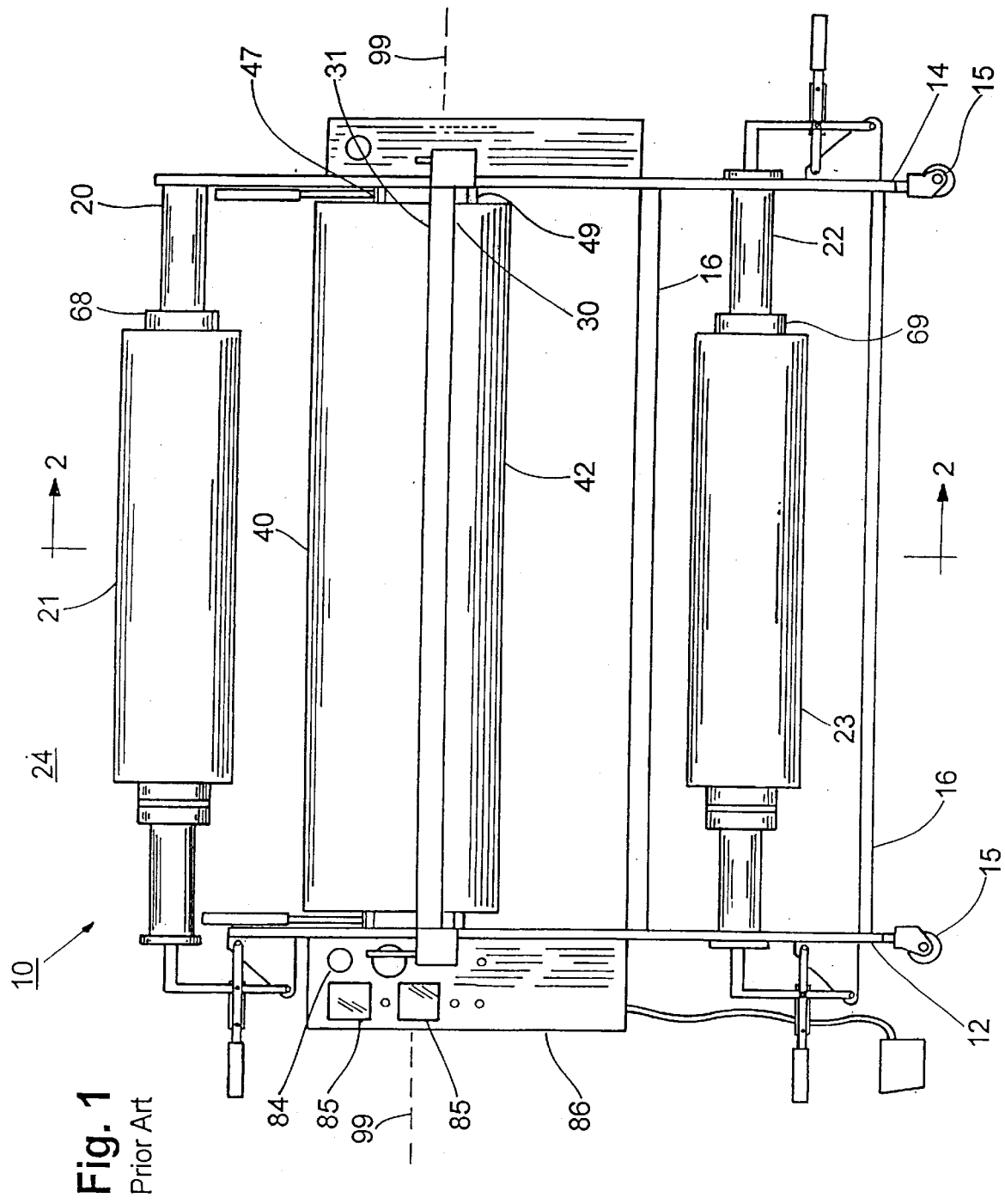
FIG. 1 is a front elevational view of a prior art laminating machine, viewed in the direction of motion of the workpiece through it.

The present invention can be used with a variety of calender machines. However, since the preferred application is for use with a laminating machine, reference will be made to such a machine.

Laminating machines of well-known design are used to laminate a heat and/or pressure sensitive film material (usually transparent) to at least one side of a substrate. The laminating process usually involves the application of heat and pressure to the film, however, cold laminating processes are also known. Many times, after a substrate has been laminated, it is desirable to mount the laminated substrate onto a backing board. This is done by applying a pressure-sensitive adhesive layer to the bottom of the substrate during the laminating process. The film-substrate-adhesive "sandwich" is then run back through the laminating machine over a backing board or other rigid mounting substrate. The backing board is preferably a foam board having a thickness significantly greater than the original substrate. The laminated substrate is secured to the backing board by way of the adhesive layer.

Laminating machines are also used to encapsulate a substrate between two laminates. The encapsulating process and the laminating process are similar operations. Accordingly, these terms may be used interchangeably except when noted otherwise.

As used herein, "substrate" is defined as the initial object (paper, photograph, etc.) which is being laminated. A "workpiece" is defined as the laminated substrate. However, it should be understood that these terms are interchangeable in many instances.

Referring to the drawings, like numerals refer to like parts. A prior art laminating machine is indicated at 10 in FIG. 1. This view is taken from a front or feed side 24 of the laminating machine 10. The machine comprises two parallel end members 12, 14 which serve as a frame or support structure on which the various elements of the laminating machine are attached. Left end member 12 and right end member 14 may include corresponding casters 15 at the bottoms thereof. The end members 12, 14 are retained in spacial relationship by a plurality of tie bars 16.

Although the laminating film may be pre-cut to the approximate shape of the substrate, it is usually desirable to use a continuous sheet or web of film. The continuous sheet may be wrapped around a spool. If only one side of the substrate is being laminated, a spool 68 of heat-activated film laminate 21 is mounted on a top unwind shaft 20. If the substrate is to be mounted or encapsulated, a second spool 69 of film 23 is mounted on a bottom unwind shaft 22. The film used for mounting purposes is preferably a pressure-sensitive film having an adhesive on its bottom side (i.e., the side facing away from the substrate). If the substrate is being encapsulated, the film on the bottom unwind shaft 22 is preferably a second heat-activated laminate. Unwind shafts 20, 22 spin freely about their respective axes.

A first horizontal table or platform 30 is mounted between end members 12, 14 at the feed entrance side 24 of the laminating machine 10. The upper or top surface 31 of the horizontal platform 30 supports the substrate and helps an operator guide the substrate into a pair of heated main rollers 40, 42.

A variety of methods are known to heat rollers 40, 42. Two common methods are to position electrically resistive elements inside the rollers, or to circulate a heated fluid through the interior of the rollers.

A control panel 86 may be located on the left hand side of the machine. This panel includes a main power switch 84 and other controls for raising and lifting rollers, controlling the heat to the rollers and various readouts, including temperature readouts 85.

Figure 2:
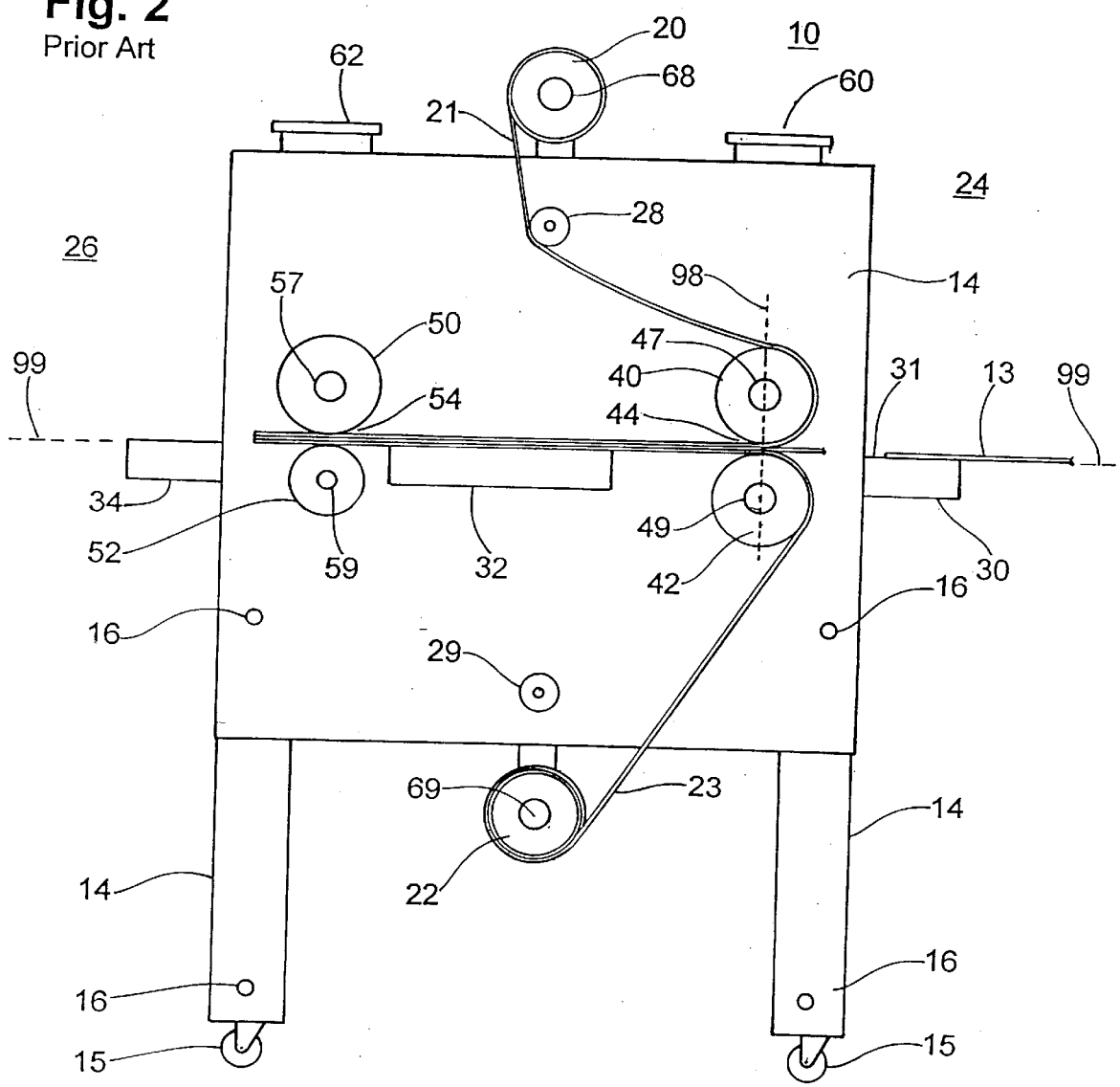
FIG. 2 is a cross-sectional diagrammatic view of the laminating machine of FIG. 1, taken along line 2—2.

FIG. 2 is a cross-sectional diagrammatic view of the laminating machine of FIG. 1 taken along lines 2—2. The laminating machine 10 has a first or entry side 24 and a second or exit side 26.

A horizontal plane 99 defined by the upper surface 31 of first platform 30 will be used as a reference throughout this specification. Therefore, an object in the horizontal plane 99 is defined as having an elevation angle of zero degrees (0°) An object below the horizontal plane would have a negative elevation angle.

As seen in FIG. 2, the bottom heated roller 42 is fixed at a height such that it is substantially tangent to the plane of the upper surface of platform 30. This locates the nip 44 of the main rollers 40, 42 in the reference horizontal plane 99.

Each roller 40, 42 includes an axial support rod 47, 49 about which the rollers respectively rotate. A drive means, including a motor, sprockets and chains or belts, provides the power to rotate at least one of the main rollers. In one embodiment, the bottom main roller 42 is driven, while the top main roller 40 is spring biased to frictionally engage the bottom main roller 42. In this manner, both rollers 40, 42 rotate. The top main roller 40 rotates about its support rod 47 in a clockwise direction as viewed from the left side. The bottom main roller 42 rotates about its support rod 49 in a counter-clockwise direction.

The axis of each support rod for rollers 40, 42 are substantially parallel to the reference plane 99. Further, a second plane common to the axes of the main rollers 40, 42 is substantially perpendicular to the horizontal plane defined by the upper surface 31 of the front platform 30. This second plane is sometimes referred to as the vertical reference plane 98.

When a relatively thin substrate is being laminated, the main rollers 40, 42 are substantially in contact with each other. thereby forming a first nip 44. The nip 44 is defined as the line of contact at which top main roller 40 meets bottom main roller 42. First nip 44 is planar to the top surface of the first platform 30, i.e., it lies within the horizontal reference plane 99.

Intermediate platform 32 supports the laminated substrate, or workpiece, after it leaves the main rollers 40, 42, and also helps guide the workpiece into a pair of cold or pull-rollers 50, 52. Exit platform 34 supports the workpiece when it leaves pull-rollers 50, 52. The top surfaces of supporting platforms 30, 32 and 34 are substantially in the same plane.

The pull-rollers 50, 52 are supported by axial support shafts 57, 59. The pull-rollers 50, 52 literally pull the workpiece 13B through the laminating machine 10. They are especially effective in keeping the films 21, 23 taut during the entire laminating process. In addition, pull-rollers 50, 52 compress the workpiece 13A at a nip 54. Pull-rollers 50, 52 also aid in cooling the workpiece, thereby helping to set the laminate.

Second nip 54 is defined as the contact point between an upper cold roller 50 and a bottom cold roller 52. Main roller nip 44 and pull-roller nip 54 are also planar to the top surface of the supporting platforms 30, 32, and 34.

The drive means rotates the bottom pull-roller 52 in a substantially counter-clockwise direction as viewed from FIG. 2. The top pull-roller 50 is biased by a spring tension means which forces the upper pull-roller 50 against the bottom pull-roller 52. As bottom roller 52 rotates, a workpiece 13A is forced through nip 54 and top pull-roller 50 rotates in a substantially clockwise direction.

When the substrate 13 is relatively thick, e.g., during a mounting process, the main rollers 40, 42 and the pull-rollers 50, 52 must be adjusted to accommodate the thickness of the substrate. A means for raising and lowering one or both rollers of each associated pair is needed. A first shim wheel 60 cooperates with the supporting rod 47 of the top main roller 40. By turning or adjusting shim wheel 60, in one direction, the top main roller 40 will rise above the horizontal plane 99, thereby increasing the radial distance between the top main roller 40 and the bottom main roller 42. When the shim wheel 60 is adjusted in the opposite direction, the top main roller 40 will be lowered, thereby decreasing the radial distance between the top main roller 40 and bottom main roller 42.

Second shim wheel 62 operates in a similar manner by raising and lowering top pull-roller 50. By adjusting both shim wheels 60 and 62, various thicknesses of substrates can be accommodated.

A plurality of idler rollers 28, 29 may be utilized in a typical laminating machine. The film may be brought in contact with or wrapped around an idler roller; this helps in guiding the film and/or in increasing tension on the film.

With reference to FIG. 2, a typical laminating and mounting process, in accordance with the prior art, will be described. A roll 68 of heat-activated laminate 21 is mounted on the top unwind shaft 20. A roll of pressure-sensitive mounting adhesive 23 is mounted on the bottom unwind shaft 22. The heat-activated laminate 21 is spooled off from the top of its roll, while the pressure-sensitive mounting film 23 is spooled off from the bottom of its roll. In addition, the heat-activated laminate 21 is threaded around idler roller 28. The spooling direction and the threading of the webs around various idlers is dependent on the operating conditions, including the type of film used, the substrate, and the operator's discretion.

The heat-activated laminate 21 and the pressure-sensitive adhesive film 23 are threaded into the nip 44 of the main rollers 40, 42. It is preferable to thread a portion of the laminate 21 and adhesive 23 through the heated main rollers before introducing a substrate 13. This will ensure that all edges of the substrate 13 will be sealed.

The operator activates the means for heating (not shown) the main rollers 40, 42. A roller heating control is located on panel 86, as shown in FIG. 1. A temperature-sensing means senses when the optimum laminating temperature has been reached and readouts 85 for each roller 40, 42 are provided on control panel 86.

The operator adjusts shim wheels 60, 62 to accommodate the thickness of the substrate 13. After the main rollers 40, 42 reach the desired temperature, the drive means is engaged, and the operator feeds the substrate 13 into the nip 44 of the main rollers 40, 42. The main rollers 40, 42 apply heat and pressure to the laminate 21 and the adhesive film 23, wherein both films are activated, sealing against the substrate 13.

The substrate 13 is supported by the feed platform 30 as it is drawn into nip 44 of the main rollers 40, 42. After lamination, the workpiece 13A, is supported by intermediate platform 32. Platform 32 also guides the workpiece 13A into the nip 54 of pull-rollers 50, 52. The laminated workpiece 13A leaves the laminating machine 10 at the exit side 26 and is supported by terminal platform 34.

After the workpiece 13A has exited the machine, the film may be cut. Also, the laminate 21 and the adhesive 23 may be trimmed from the perimeter of the workpiece 13A.

After the main rollers have cooled, the workpiece 13A may now be mounted on a foam board or other appropriate medium. To accomplish this, the operator must adjust the shim 60 to increase the radial separation distance between main rollers 40 and 42. Similarly, the operator must adjust shim 62 to increase the radial distance between pull-rollers 50 and 52. If shims 60, 62 are not adjusted to accommodate the thicker mounting board, the board will either become jammed at a nip or the board will be damaged by the compressive forces applied to it at a nip. A similar process for laminating the substrate is now used to mount the workpiece to the board.

It is important to note that, during laminating, encapsulating or mounting, the substrate/workpiece travels substantially in a straight line across the horizontal reference plane 99 as it moves through the laminating machine 10. That is, prior art laminating machines are designed to keep the substrate flat throughout the laminating process by ensuring that the nips 44, 54 are planar to the top surfaces of supporting members 30, 32 and 34.

As seen in FIG. 1, many laminating machines are designed with only side members 12, 14 providing structural support. Front, top and rear sides are open; this allows access to all rollers. This design is commonly used since the laminate must be threaded through the rollers, where it frequently becomes jammed within the laminating machine. Accordingly, the laminating machine must allow easy access for the operator to unjam a substrate in order to continue the laminating process. It is a design goal of all laminating machines to reduce the number of jamming incidents. Accordingly, it was believed that the substrate must remain substantially flat throughout the entire laminating process.

Figure 3:
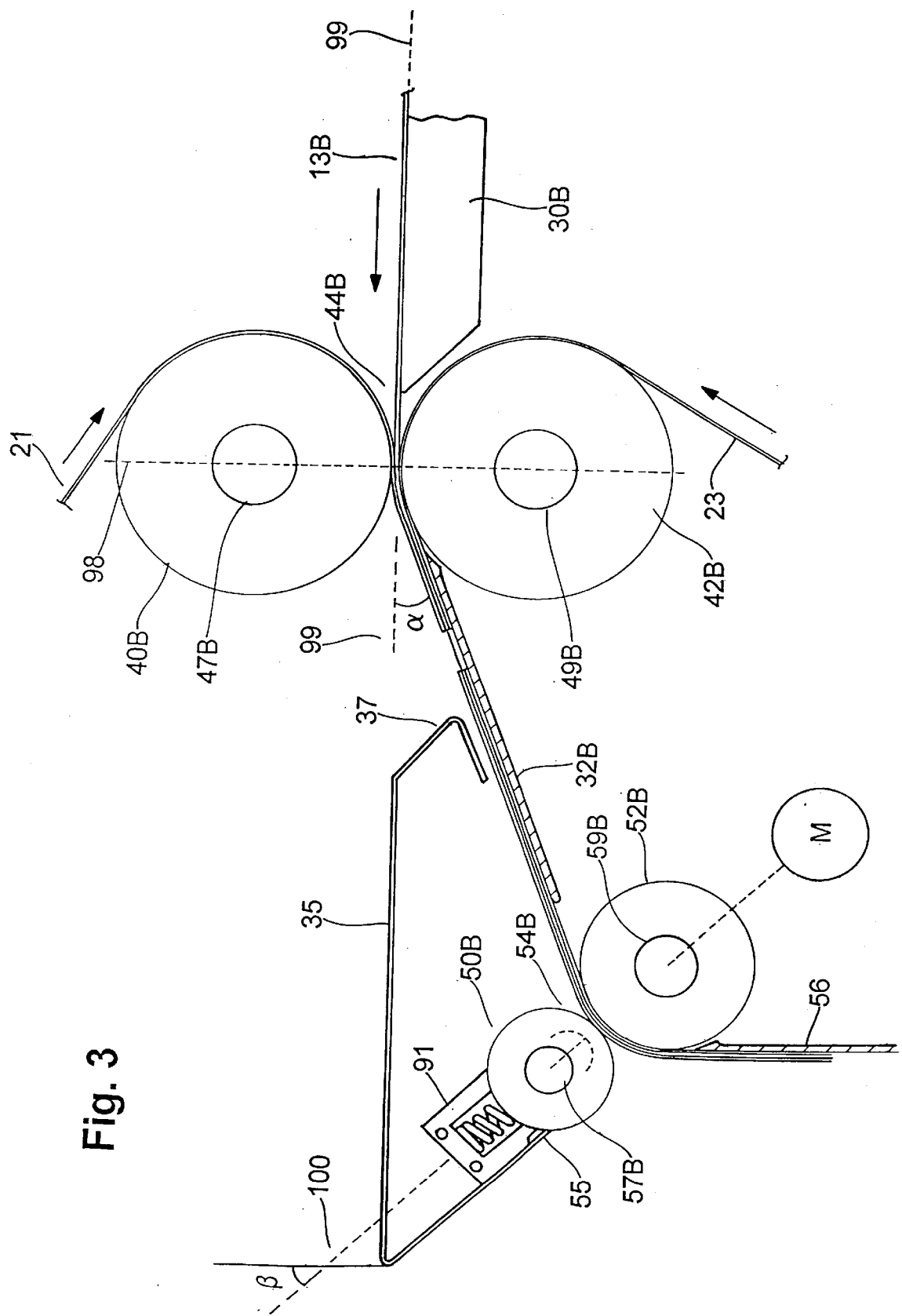
FIG. 3 is a diagrammatic side view of a roller system in accordance with the present invention, for use in a laminating machine as it is set up for encapsulating a substrate.

Referring now to FIG. 3, the instant invention is directed towards a method, and an apparatus for performing the method, of pulling the film and substrate at an angle from the horizontal plane as it leaves the main rollers 40, 42. This is achieved by positioning the pull-rollers 50B and 52B at an elevation below the horizontal reference plane 99 (i.e. the nip 54B is not planar to the horizontal reference plane 99). In the preferred embodiment, the elevation angle of the pull-roller assembly is approximately eighteen degrees below the horizontal plane (i.e., $\alpha = -18°$)

The front end of the laminating machine 10B utilizing the subject pull-roller assembly is identical to a prior art laminating machine. Moreover, the drive means of the subject off-set pull-roller system is similar to the drive means of a prior art laminating machine.

After a flexible laminated substrate 13B exits the main rollers 40B, 42B, support guide 32B directs the workpiece downwards (i.e., at an angle below horizontal) into a nip 54B of pull-rollers 50B, 52B. A guide piece 35 having a specially designed nose 37, positioned above the pull-rollers, ensures that a flexible workpiece is automatically fed into nip 54B.

An advantage of lowering the entire pull-roller assembly below the horizontal reference plane is that the web contacts a greater surface area of both bottom main roller 42B and bottom pull-roller 52B. This provides for a more even heating process over the heated rollers. Further, there is a greater cooling effect by the pull-rollers. This improves the quality of the laminating process.

Although it is believed that similar results may be obtained by raising the pull-roller assembly above the horizontal plane, the embodiment shown in FIG. 3 has an additional advantage in that the substrate is; gravity fed into nip 54B. The operator no longer has to initially assist or manually feed the laminated substrate into the pull-rollers 50B, 52B. In this manner, the chances of the operator getting his or her fingers pinched between the nips of the pull-rollers is eliminated. Therefore, the non-planar location of the nip 54B has a safety advantage.

Another important design feature of the subject assembly is that the support axes 57B and 59B of pull-rollers 50B, 52B; respectively, are no longer in a common substantially vertical plane perpendicular to the horizontal reference plane 99. In previous laminating machines, the plane of the pull-roller axes is parallel to the vertical reference plane 98.

As seen in FIG. 3, imaginary line 100, representing the pull-roller axes plane, is offset at an angle β from the vertical. In the preferred embodiment, the offset angle is approximately thirty degrees (i.e., β=30°).

By offsetting the pull-roller axes, the web remains in contact with the bottom pull-roller 52B for a longer period of time. This improves the quality of the laminating process by cooling the laminate (thereby helping the laminate set) and by increasing the probability that the laminating film lies flat against the substrate (thereby reducing the formation of bubbles or pockets).

Further safety gains may be attained by partially or fully enclosing the pair of pull-rollers 50B, 52B. The preferred embodiment incorporates a partial housing around the feed side of nip 54B. If the pull-rollers 50B, 52B are fully enclosed, only an entry slot and an exit slot are needed to allow passage of the workpiece 13B. Since the workpiece is automatically fed into the pull-rollers, and since the present design reduces thy probability of jamming at the pull-rollers, access to the pull-rollers is no longer a design parameter.

In order to further reduce the chance of a workpiece jamming, first and second scrapers 55, 56 are positioned proximate pull-rollers 50B, 52B, respectively. In addition, the leading edge of support guide 32B has a substantially knife-like design. These features prevent the workpiece from sticking to the various rollers.

A spring-biased means 91, which cooperates with top pull-roller 50B, is used to accomodate various thicknesses of flexible substrates.

Figure 4:
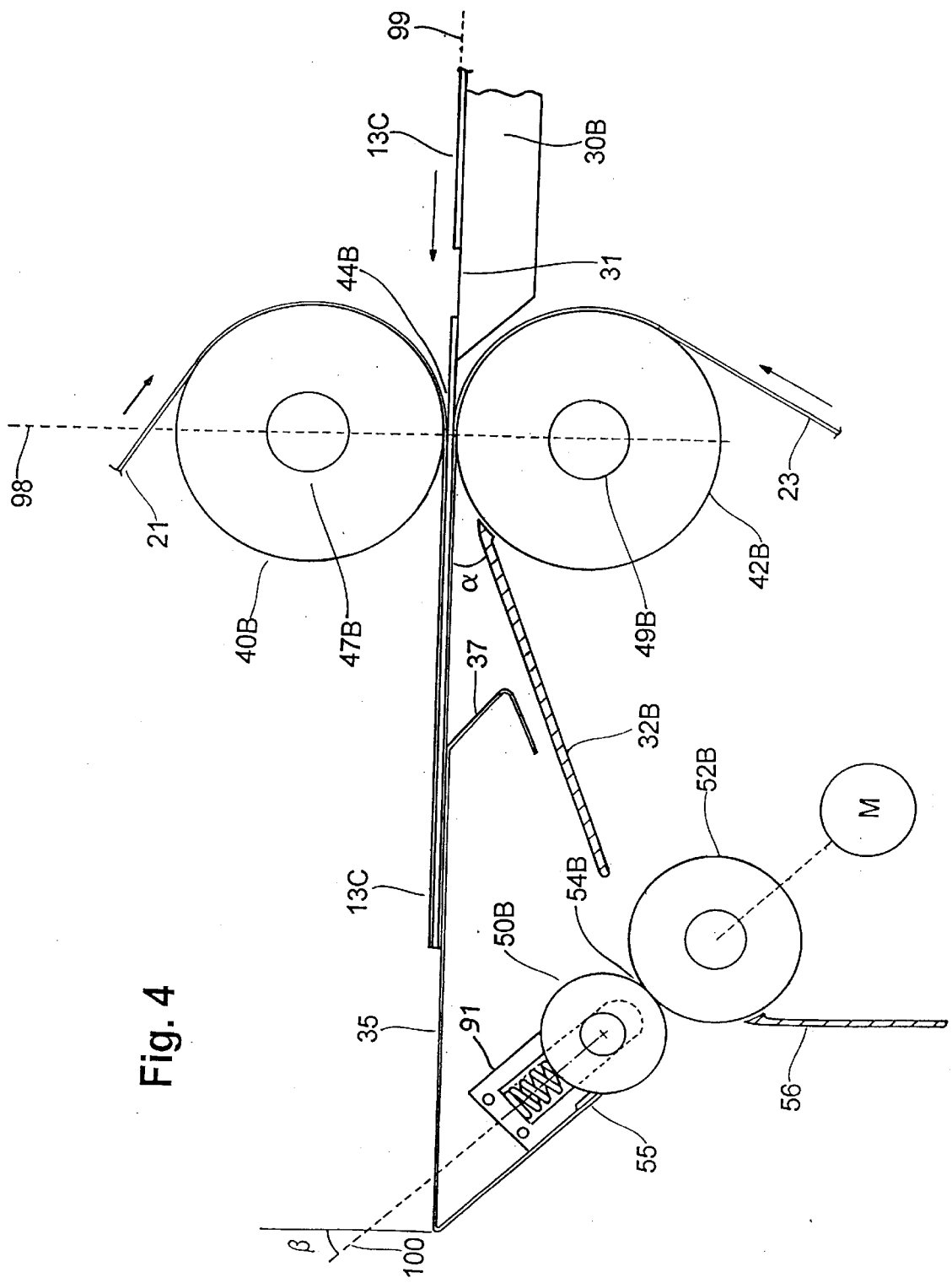
FIG. 4 is a diagrammatic side view of the roller system of FIG. 2, as it is set up for use with a mounting substrate.

As shown in FIG. 4, guide piece 35 also supports a rigid workpiece 13C in the horizontal plane as it exits the main rollers 40B, 42B, thereby avoiding the pull-rollers 50B, 52B. The main rollers 40B, 42B provide sufficient force to push the rigid board through the laminating machine 10B. Although a radial distance adjusting means is still needed for the main rollers, the radial distance adjusting means for the pull-rollers 50B, 52B has been eliminated.

Even though particular embodiments of the present invention have been illustrated and described herein, they are not intended to limit the invention. It is therefore to be understood that modification and variation of the embodiments described above may be made without departing from the spirit or scope of the invention.

We claim:

1. A method of pulling a substrate through a laminating machine, the laminating machine having cylindrical rollers forming a nip through which the substrate is fed, a feedway on the feed side of the nip for supporting the substrate, the feedway having a substantially horizontal top surface defining a plane, the nip lying within said plane, the axes of rotation of the rollers being parallel to said plane, the method comprising the steps of:

supplying a laminating film and a series of substrates to said nip;

laminating said laminating film and said series of substrates at said nip to form workpieces;

providing a pair of exit pathways, each of which provides for automatic pathway guidance without manual intervention by the operator, a first exit pathway for guiding laminated relatively rigid workpieces in substantially said plane and a second exit pathway for guiding laminated relatively flexible workpieces into cylindrical pull-rollers at an elevation different than the elevation of said plane.

2. A method according to claim 1 in which the pull-rollers are located at an elevation lower than said plane.

3. In a laminating machine for laminating activatable film to a substrate to form a workpiece, the laminating machine having a film supply roll supplying a continuous strip of laminating film; a pair of heated rollers mounted in spaced relation on parallel axes to form a nip through which the substrate and film are fed for applying heat and pressure to activate the film and thereby form the workpiece, the nip having a feed side and an exit side, a feedway positioned on the feed side of the nip for supporting the substrate as the substrate is fed into the nip, the feedway having a substantially horizontal top surface which is substantially planar to the nip, the improvement comprising:

a pair of pull-rollers mounted in spaced relation on parallel axes to form a second nip, said second nip being non-planar to the top surface of the feedway;

a first workpiece guide piece mounted below the desired path of travel of the workpiece and extending from the region of the exit from the exit side of the nip of the heated rollers to the region of the entrance nip of the pull rollers, a second workpiece guide piece having a portion presented upwardly and a portion presented downwardly and being mounted in the region of the exit from the nip of the heated rollers with the upwardly presented portion thereof being planar to the feedway into the nip of the heated rollers, the second workpiece guide piece having its downwardly presented portion positioned so as to be in spaced relation to the upper surface of a workpiece in the desired path of travel of the workpiece between the exit from the nip of the heated rollers and the entrance nip of the pull rollers whereby, without manual intervention of the operator, a relatively rigid workpiece is guided automatically into a first exit pathway substantially in the same place as the top surface of the feedway and a relatively flexible workpiece is guided into a second exit pathway, said second exit pathway including said second nip.

4. The laminating machine of claim 3, wherein the second nip is at an elevation below that of the top surface of the feedway.

5. The laminating machine of claim 4 wherein the second nip is parallel to the top surface of the feedway.

6. The laminating machine of claim 5 wherein the second nip is substantially perpendicular to the direction of travel of the flexible workpiece.

7. The laminating machine of claim 4 wherein the laminating machine includes at least two film supply rolls for supplying two continuous strips of laminating film for encapsulating the entire workpiece.

8. The laminating machine of claim 4, further comprising a structure for enclosing the pull rollers, the structure having apertures for allowing entry and egress of the workpiece to the pull rollers, the apertures preventing the entry of foreign objects thereby preventing damage to the pull-rollers and injury to operators.

9. A laminating system for laminating film to a first workpiece and to a second workpiece, said first workpiece being relatively rigid and said second workpiece being relatively flexible, said system comprising:

a pair of laminating rollers forming a laminating nip between them;

film supply means for feeding a laminating film into and through the laminating nip of said pair of laminating rollers;

means for delivering said first and second workpieces into said laminating nip at different times, with said film lying against said workpieces, to effect lamination thereof;

a pair of pull-rollers forming a second nip and located at a position lower than said laminating nip; and guide pieces positioned generally between said laminating rollers and said pull-rollers, said guide pieces being constructed and arranged so as to permit, automatically and without manual intervention by the operator, said second workpiece to travel downwardly into said pull-rollers and said first workpiece to proceed substantially horizontally from said laminating nip.

10. The system of claim 9, wherein said guide pieces comprise:

a horizontal work surface member for supporting said first workpiece horizontally after it exits from said laminating rollers; and a downwardly-sloping guideway for guiding said second workpiece to said pull-rollers.

11. The system of claim 10, wherein said horizontal work surface member comprises a gap through which said second workpiece can pass downwardly from said laminating nip to said pull-rollers, said first workpiece being of a size and rigidity to bridge said gap in travelling from said laminating nip along said work surface member.

12. The system of claim 10 in which said horizontal work surface member comprises the guide pieces having the effect of guiding said workpieces along their respective pathways.

13. A laminating system according to claim 9 in which the laminating nip and the pull-roller nip are adjustable and the upper roller of the pair of pull-rollers is movable toward and away from the lower roller and is spring biased toward the lower roller.

14. A system for laminating a series of workpieces with a film, comprising:

a pair of laminating rollers forming a laminating nip between them;

means for supplying a laminating film and a series of workpieces to be laminated to said nip, to accomplish said laminating thereof;

a pair of pull-rollers positioned at a level lower than said laminating nip; and guide pieces constructed and arranged so as to permit, automatically and without manual intervention by the operator, said laminated workpieces that are relatively flexible to travel from said laminating nip to said pull-rollers and said laminated workpieces that are relatively rigid to travel in a substantially horizontal exit plane parallel to said laminating nip.

15. The system of claim 14, wherein said glide pieces comprise:

a horizontal work surface for supporting said relatively rigid laminated workpieces horizontally after exiting from said laminating rollers; and a downwardly-sloping guideway for guiding said relatively flexible laminated workpieces into said pull-rollers.

16. The system of claim 15, wherein said horizontal work surface comprises a gap through which said relatively flexible laminated workpieces can pass downwardly, under the influence of gravity, from said laminating nip to said pull-rollers, said relatively rigid laminated workpieces being of a size and rigidity to bridge said gap in travelling from said laminating nip.

17. The system of claim 16 in which said horizontal work surface comprises a member positioned so as to further guide said laminated workpieces along their respective pathways.

* * * * *

UNITED STATES PATENT AND TRADEMARK OFFICE
CERTIFICATE OF CORRECTION

PATENT NO. : 5,985,088
DATED : November 16, 1999
INVENTOR(S) : Cal L. Couillard and Bruce Adams It is certified that error appears in the above-identified patent and that said Letters Patent is hereby corrected as shown below:

Claim 3, column 8, line 33, change "place" to --plane--.

Signed and Sealed this

Thirtieth Day of May, 2000

Attest:

Q. TODD DICKINSON

*Attesting Officer*    *Director of Patents and Trademarks*